(12) United States Patent
Flörsheimer et al.

(10) Patent No.: US 6,659,930 B2
(45) Date of Patent: Dec. 9, 2003

(54) METHOD AND APPARATUS FOR FOLDING AN AIRBAG

(75) Inventors: Stefan Flörsheimer, Flörsheim (DE); Michael Bieg, Rüsselsheim (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/197,648

(22) Filed: Jul. 18, 2002

(65) Prior Publication Data

US 2003/0114287 A1 Jun. 19, 2003

(30) Foreign Application Priority Data

Dec. 18, 2001 (DE) .......................... 101 62 233

(51) Int. Cl.$^7$ ................................. B31F 1/00
(52) U.S. Cl. .................... 493/430; 493/449; 493/457; 493/433; 493/448; 280/743.1; 280/728.1
(58) Field of Search ................ 493/449, 457, 493/415, 430, 433, 448, 451; 280/743.1, 728.1

(56) References Cited

U.S. PATENT DOCUMENTS

| | | | |
|---|---|---|---|
| 4,508,527 A | * | 4/1985 | Uno et al. ................. 493/357 |
| 5,472,233 A | * | 12/1995 | Horiuchu et al. ........ 280/743.1 |
| 6,092,835 A | * | 7/2000 | Thakore et al. .......... 280/728.3 |
| 6,115,998 A | | 9/2000 | Reh et al. ..................... 53/429 |
| 6,152,867 A | * | 11/2000 | Heudorfer et al. .......... 493/451 |

FOREIGN PATENT DOCUMENTS

| | | |
|---|---|---|
| DE | 29809356 | 9/1998 |
| DE | 19751685 | 5/1999 |
| DE | 19942703 | 3/2001 |
| WO | WO 99/20492 | 4/1999 |

\* cited by examiner

*Primary Examiner*—Rinaldi I. Rada
*Assistant Examiner*—Michelle Lopez
(74) *Attorney, Agent, or Firm*—Lonnie Drayer; Jarett Rieger (57) ABSTRACT

A method and an apparatus for folding an airbag of a vehicle occupant restraining system, having a conveyor means, in which a first portion of the spread-out airbag is moved in order thus to push a second portion of the airbag against an abutment which has at least one abutment surface extending substantially parallel to the direction of movement, so that the second portion of the airbag is laid in folds. In order to obtain a regularly folded airbag in a particularly simple manner, the conveyor means is formed with at least one rotating conveyor element which can move the first portion of the airbag in the direction of the abutment.

10 Claims, 8 Drawing Sheets

METHOD AND APPARATUS FOR FOLDING AN AIRBAG

FIELD OF THE INVENTION

The present invention relates to a method and apparatus for folding an airbag for a vehicle occupant restraining system.

DISCUSSION OF THE PRIOR ART

U.S. Pat. No. 6,115,998 teaches a method and apparatus for folding an airbag wherein the empty airbag for an airbag module, which is spread out, is gathered together towards a center within a fixed height profile. In contrast to other previously known types of folding, in this method chaotic folding is carried out. Consequently, the folds made have no predetermined shape or direction. Although only a few gathering elements and operational steps are required to gather the airbag together, the chaotic folding may have a negative effect when the airbag module opens. An apparatus for carrying out the method has a lower part for receiving the spread-out airbag and an upper part that is at least in some locations spaced apart from the lower part by gaps. The gaps correspond to the required height profile of the gathered-together airbag. As the gathering elements, slide means are provided between the upper part and the lower part and these surround the airbag at the rim thereof, their position with respect to the latter being variable. The airbag is pushed onto a gas generator of the airbag module, starting from its outer rim and going to the center with the aid of the slide means, and this makes the chaotic folding.

DE 19 751 685 A1 teaches a method and an apparatus for folding an airbag for a vehicle occupant restraining system in which the airbag is folded into an elongate housing. First the airbag is spread out flat on a substrate, and then the wall of the airbag is folded together in a zigzag shape approximately centrally and transversely with respect to the longitudinal direction and is put into the housing. Finally, the end regions of the airbag, starting from the central region put into the housing and progressing towards the ends of the housing, are pressed into the latter. The associated apparatus is has a folding mechanism with a fixed folding part and two movably mounted pushing parts which are displaceable between a position close to the folding part and a position spaced therefrom.

The methods and apparatuses mentioned above have the disadvantage that they are either of complex construction or give only chaotic folding of the airbag in a housing.

SUMMARY OF THE INVENTION

The inventive method and apparatus take as their starting point an unfolded airbag that is laid out in a spread-out fashion or is presented with virtually no folds in another way, for example is held hanging.

In the inventive method for folding an airbag, in contrast to the prior art, the airbag is not moved by a gathering element or slide means surrounding the airbag and variable in its position with respect to the latter. Instead, a rotating conveyor element which is mounted to be fixed in its location is used, and this acts on a first portion of the airbag and draws it in the direction of an abutment, at the same time the adjacent second portion being pushed up to the abutment. When conveying using a rotating conveyor element, surprisingly the advantage arises that the spread-out airbag can be moved by means of its first portion in a guided manner in contrast with conventional methods and apparatuses and hence regular and defined folding of the second portion results. The important point is that the airbag to be folded is moved against the abutment, which is substantially fixed in its location, or a stop, during folding.

Whereas with known apparatuses the spread-out airbag is pushed together irregularly at its rim, in accordance with the invention the airbag is drawn by a rotating conveyor element and at the same time is laid in defined manner in folds in a closely delimited space. The rotating conveyor element draws at the spread-out airbag and in so doing smoothes it. Downstream of the conveyor element, the airbag is conveyed against the abutment surface against which it is pushed up. Defined folds are formed, with the airbag advantageously being able to be moved towards the abutment surface at a substantially constant rate of conveying. Whereas with known methods existing folds and regions of different rigidity in the fabric of an airbag have a negative effect on folding, such factors have virtually no effect in the method according to the invention.

Moreover, the method according to the invention can be achieved using relatively simple means, so that, overall, low-cost and at the same time high-quality folding of an airbag for a vehicle occupant restraining system is provided.

The folding made in accordance with the invention can be influenced by the shape of the abutment and the shape and speed of the rotating conveyor element. In this way, chaotic folding can also be made using the inventive method and the apparatus thereof if this is desired.

In the case of an advantageous further development of the invention, the pushed first portion of the spread-out airbag is supported with respect to the rotating conveyor element. Support results in a relatively large abutment force of the first portion of the airbag against the rotating conveyor element. This leads to a relatively large holding force between the airbag and the conveyor element and hence a great pushing action against the first portion. Alternatively, the first portion can lie on the rotating conveyor element and be moved simply on the basis of the holding force produced by its own weight.

DETAILED DESCRIPTION OF THE INVENTION

Figures 1, 2:
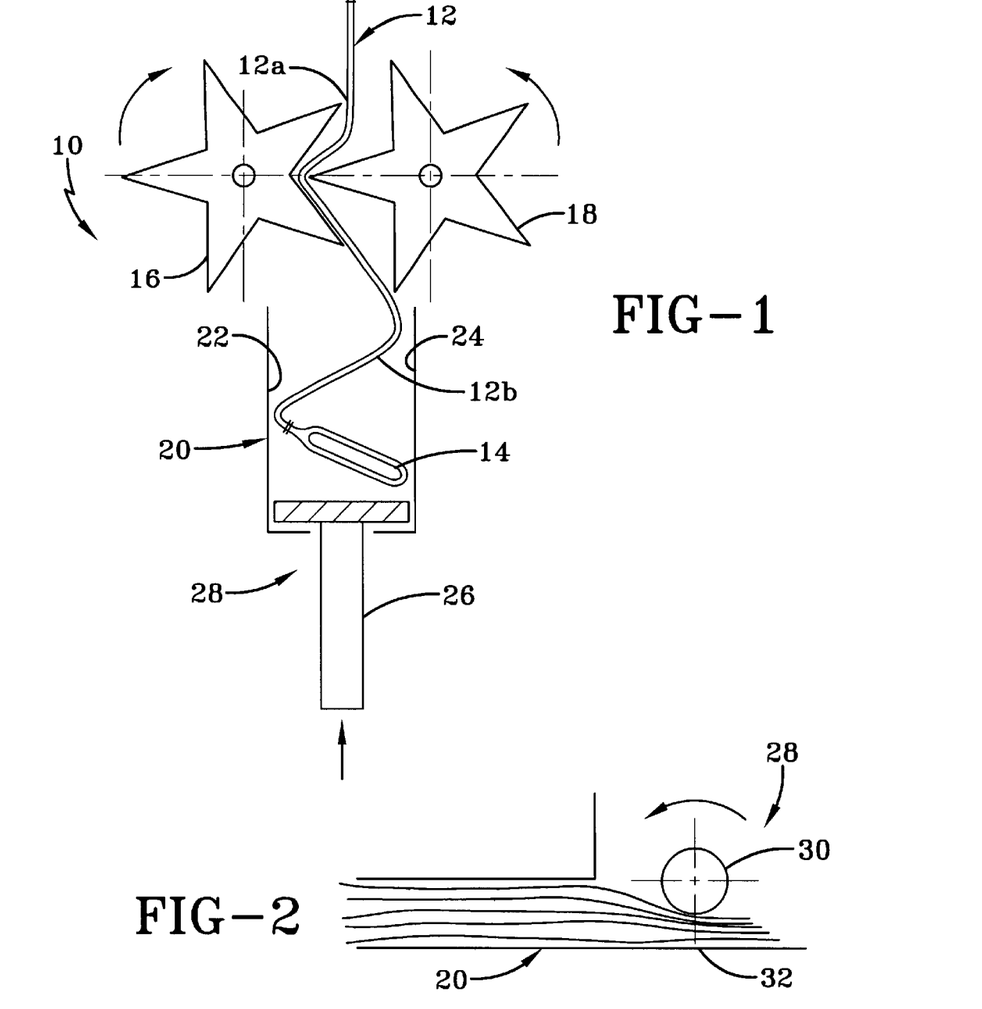
FIG. 1 is a side view of a first example embodiment of a folding apparatus according to the invention.
FIG. 2 is a side view of a first example embodiment of a compression apparatus according to the invention.

FIG. 1 illustrates a first example embodiment of an inventive folding apparatus 10 for an airbag 12 of a curtain airbag module.

An airbag 12 typically has individual chambers formed by seams. A filling hose 14 may be inserted in one or more such chambers. Typically, a gas generator is attached to the filling hose after the folding procedure. The gas generator inflates the chambers of the airbag from the filling hose, in the event of a crash. The method of the present invention may advantageously be combined with a folding procedure in which at least one further layer of the airbag is laid on the side of a filling hose opposite the constructed folds. The further layer may be obtained in a particularly simple manner by laying it aroundthe airbag and the filling hose located therein. Laying the airbag around the filling hose thereof is performed such that at least one further layer of the airbag is laid on the side of the filling hose opposite the constructed folds.

A filling hose 14 which is substantially oval in cross-section is laid in the airbag 12, with a peripheral seam indicated in each case in FIG. 1 by short double strokes being provided in particular on the airbag 12. The airbag 12 is mounted hanging in a vertical position from its upper rim by a movable suspension means (not illustrated). The airbag is advantageously laid around the filling hose thereof by pivoting the filling hose, altering its rotary position, about an angle of 90°. In this way, during pivoting two layers of the airbag may be laid on the side of the filling hose opposite the constructed folds.

To fold the airbag 12, a first and a second rotating conveyor element 16, 18 are arranged on the airbag 12 mounted hanging, each in the form of a roller which is star-shaped in cross-section. The teeth of mutually opposing rollers mesh with one another. The conveyor elements 16, 18 are advanced to the hanging airbag 12 by a pivoting or pushing movement. The spread-out airbag is pushed between the two rotating conveyor elements and moved in the direction of the abutment in a defined manner. A conveyor belt of this kind has a relatively particularly large abutment surface with respect to the first portion of the airbag. This may be advantageous if relatively large holding forces are to be achieved at the airbag. As a result of the star shape, folds are already imparted to the airbag on conveying, and these remain "stored" in the airbag and subsequently give unambiguously defined uniform folding at the abutment surface. As a result of using star-shaped or toothed rotating conveyor elements, in some circumstances it is possible to dispense with an abutment in the conventional sense. It is then sufficient if the airbag is conveyed with its stored folds to an abutment surface or support surface at which the folds are laid down regularly by the conveyor element, which is star-shaped in cross-section.

In the center, below the two rotating conveyor elements 16, 18, there is arranged a cup-shaped receiver which forms an abutment 20 for the filling hose 14 and the airbag 12 to be folded. The abutment 20 has in the interior of the cup shape a first vertical abutment surface 22 and a second vertical abutment surface 24 which lie opposite one another. A die-shaped compression slide means 26 is arranged at the base of the cup shape. Flap valves (not illustrated) are located at the upper rim of the cup shape. As will be explained below, the flap valves and the die-shaped compression slide means 26 act as a compression apparatus 28 for the folded airbag 12.

The airbag 12 is folded by moving a first portion 12a of the airbag 12, which is located between the rotating conveyor elements 16, 18 which are star-shaped in cross-section. The airbag 12 has two layers of bag material lying one on top of the other, with both layers being folded at the same time. The first portion 12a is in this arrangement moved downwards, relative to FIG. 1, with a second portion 12b of the airbag 12 located in the region of the filling hose 14 being moved into the cup-shaped abutment 20. The filling hose 14 comes to lie against the compression slide means 26 and then further airbag material is conveyed in the direction of the abutment 20 by the rotating conveyor elements 16, 18. During this, the first portion 12a of the airbag 12 is moved between the rotating conveyor elements 16, 18, whereas the second portion 12b of the airbag 12 is pushed against one of the abutment surfaces 22, 24. The second portion 12b comes into abutment against one of these abutment surfaces and forms a fold, after which it is displaced to the other abutment surface in order to form another fold there. The second portion 12b is thus folded in a controlled and regular manner within the cup-shaped abutment 20.

By means of the conveyor elements, which are star-shaped in cross-section, or rollers 16, 18, a fold is pre-shaped in the first portion 12a of the airbag 12 by providing the conveyor elements with teeth which mesh with one another. The teeth are in particular constructed to have relatively sharp edges, so that a fold hollow is formed at each tooth when conveying by the conveyor elements 16, 18 takes place. The conveyor belts pre-shape the airbag as ordered folds before the actual laying down, with the pre-shaping being capable of particular permanence in its construction.

The airbag 12 is laid down in the cup-shaped abutment 20, which forms a fold shaft for the airbag 12 once the latter is folded and may subsequently be sealed with the aid of the flap valves (not illustrated) and made smaller by an upward movement of the compression slide means 26 in order to further compress the airbag 12 once the latter is folded.

Alternatively, or in addition to the compression apparatus 28 illustrated in FIG. 1, a compression roller 30 may be arranged on the folding apparatus 10, as illustrated in FIG. 2. The compression roller cooperates with a counter-surface 32 and draws the airbag 12, once it has been folded, out of the fold shaft in order then to push it into a housing (not illustrated) of the curtain airbag module.

Figure 3:
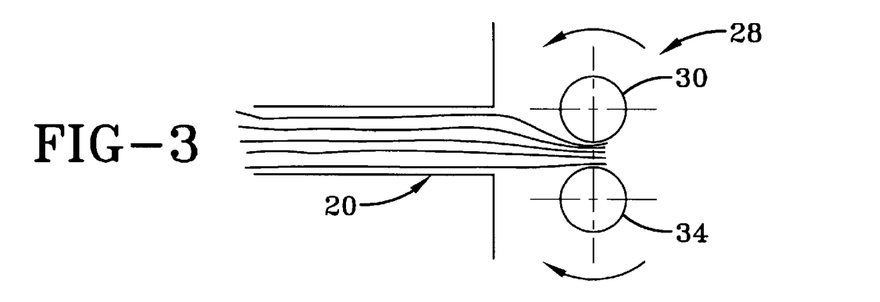
FIG. 3 is a side view of a second example embodiment of a compression apparatus according to the invention.

As an alternative to a counter-surface 32, with the compression apparatus 28 a second compression roller 34 may also be provided, as illustrated in FIG. 3, which rotates in the opposite direction to the first compression roller 30. The compression rollers 30, 34 in particular reduce the packed dimension of the airbag 12 once it has been folded.

Figure 4:
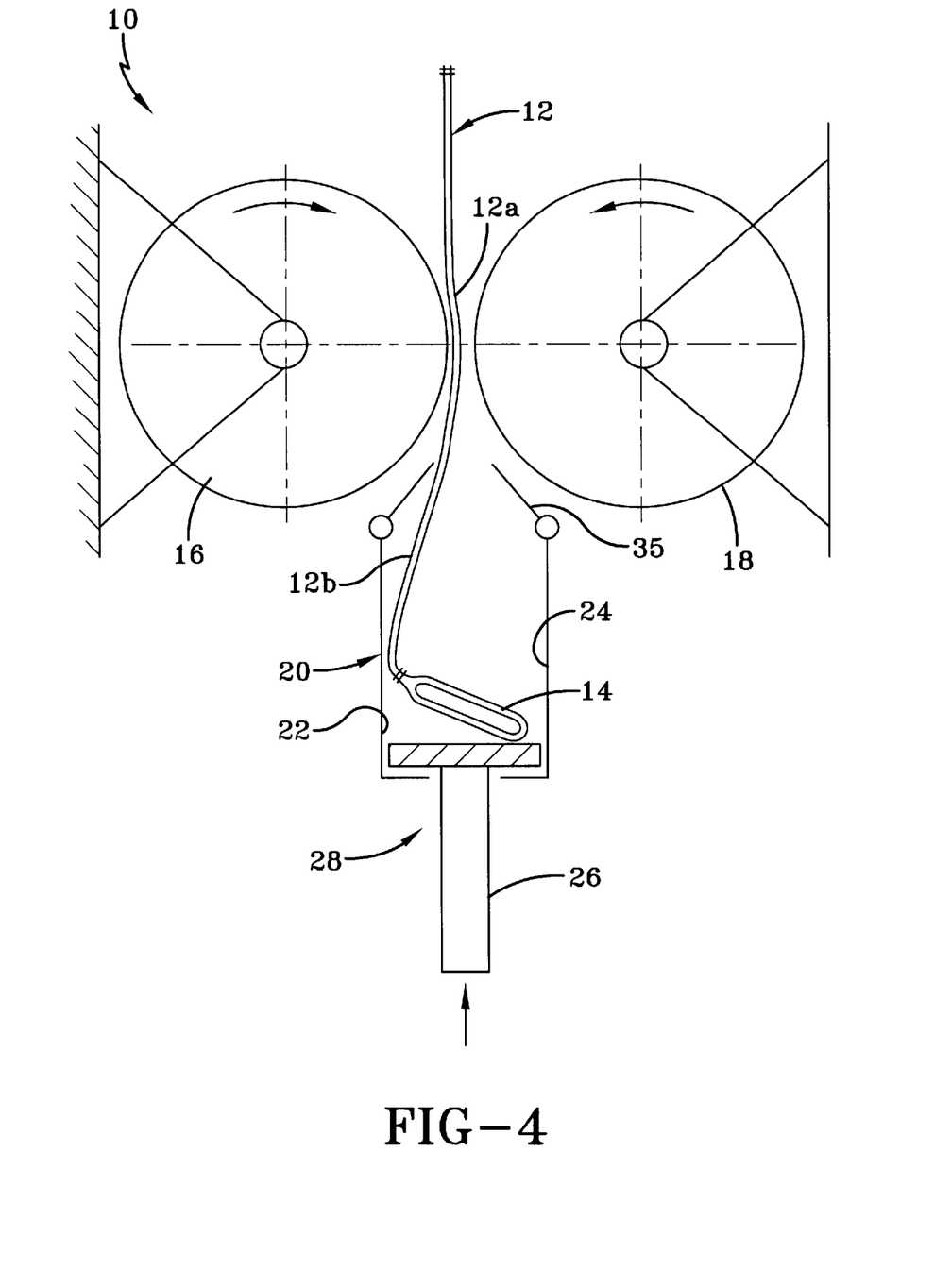
FIG. 4 is a side view of a second example embodiment of a folding apparatus according to the invention.

FIG. 4 illustrates a second example embodiment of an inventive folding apparatus 10 which is of similar construction to the folding apparatus illustrated in FIG. 1. As the rotating conveyor elements 16, 18, cylindrical rotatably mounted rollers are provided in each case, and these are arranged in opposition. Spread-out airbag regions of large surface area may advantageously be moved with the aid of the cylindrical roller. As an alternative, spherical rollers which have only a virtually punctual abutment surface with respect to the first portion of the airbag may be used. One of the rollers is in this case constructed as a fixed roller, whereas the other roller is advanced as a movable roller and its vertical position can be altered. The conveyor elements 16, 18 constructed as rollers are provided with a smooth or roughened or rubberized surface and in particular a defined abutting force can be set up between them. The rollers convey into a cup-shaped abutment 20 an airbag 12 which is arranged hanging, and the folding space of the abutment 20 can in turn be made smaller with the aid of a die-shaped compression slide means 26 opposite flap valves 35.

Because of the rotating conveyor elements 16, 18 according to FIG. 4, which are circular in cross-section, no pre-shaping of the folding takes place in the first portion 12a of the airbag 12 to be folded. The second portion 12b is consequently folded relatively irregularly into the cup-shaped abutment 20, although regular folding can however be produced as a result of an alternate laying of the second portion 12b against the opposing abutment surfaces 22, 24. The regularity of the folding may in particular be influenced by the speed of rotation of the two rotating conveyor elements 16, 18. Hence, at a particularly high rate of conveying, chaotic folding is set up, whereas with a correspondingly slow lowering of the airbag 12 into the cup-shaped abutment 20 defined fold layers can be created.

It is also possible to provide a compression apparatus 28 as illustrated in FIGS. 2 and 3 with the folding apparatus according to FIG. 4.

Figure 5:
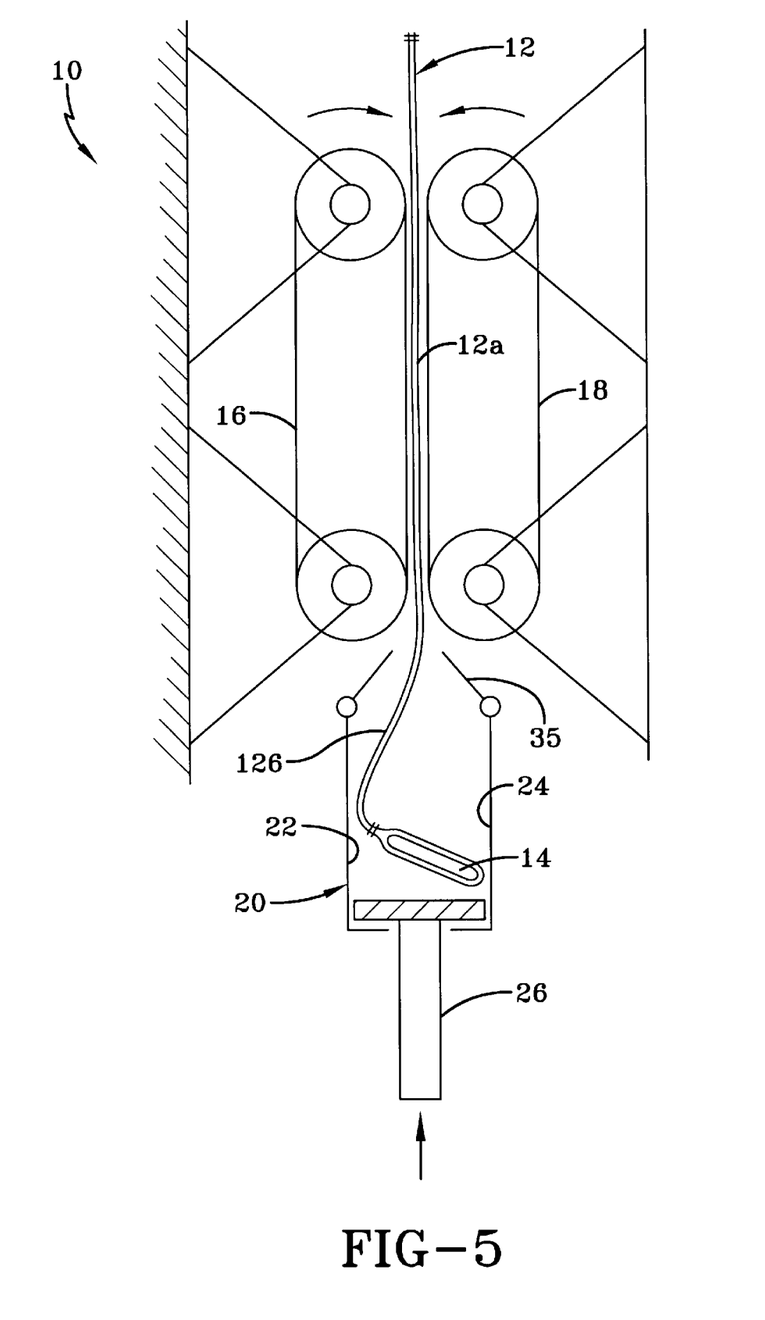
FIG. 5 is a side view of a third example embodiment of a folding apparatus according to the invention.

FIG. 5 illustrates a third example embodiment of a folding apparatus 10 according to the invention, in which the first and second rotating conveyor elements 16, 18 are each constructed as a conveyor belt with a rubber coating. In this example embodiment too, one of the conveyor elements is mounted to be fixed in its location while the other conveyor element may be advanced by means of its mounting. The conveyor elements 16, 18 in the form of conveyor belts guide the airbag 12 over a large surface area, with the conveyor belts in particular capable of being made large enough in their length and width for the entire airbag 12 to be held between them in the spread-out condition.

Various shapes of airbag can be folded using the folding apparatuses described above and also those to be explained below. For example, it is possible to fold a so-called curtain airbag which is to be arranged on a vehicle structure in an arc shape, above a side window. In order to fold the elongate airbag of an airbag of this type into an arcuate housing, a plurality of rollers or conveyor belts may be arranged next to one another over the length of the airbag, and these each push a portion of the airbag in the direction of the housing or an arcuate abutment and in so doing fold it. The axes of the rollers arranged in this way each extend substantially tangentially to an arc which follows the arcuate shape of the housing of the curtain airbag.

Folding using conveyor belts results in particular in an airbag which is folded or gathered in an undefined way in the cup-shaped abutment 20. After folding, as already explained, the flap valves 35 are closed and the folded airbag is compressed with the aid of the compression slide means 26.

Figure 6:
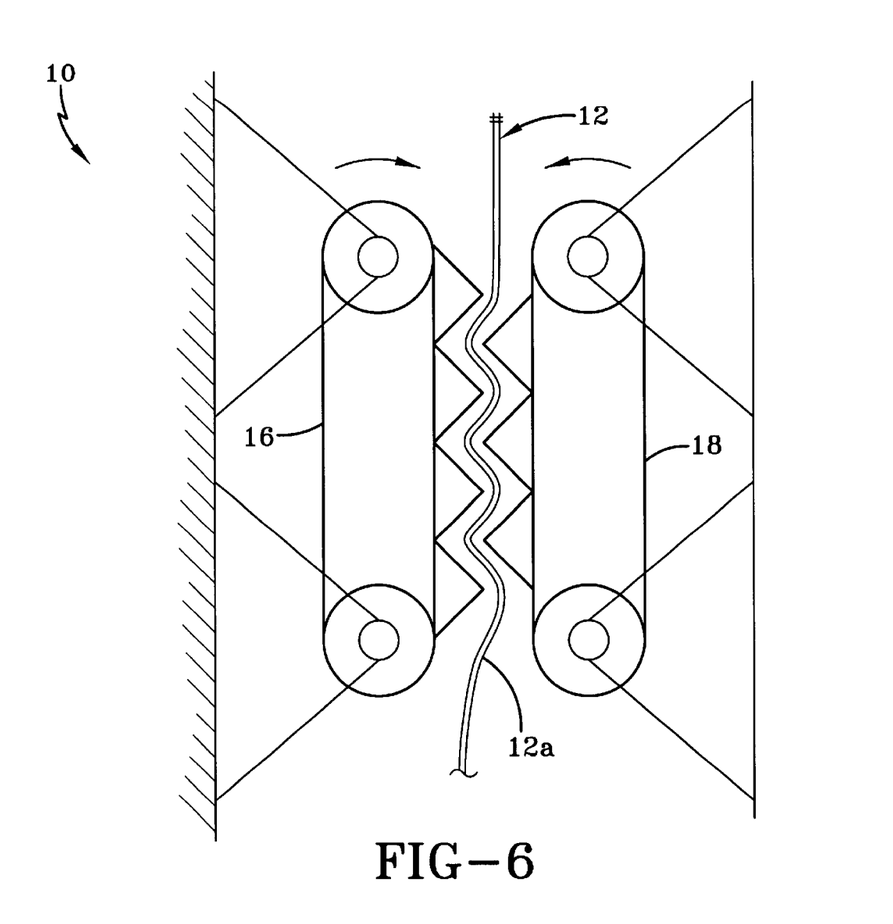
FIG. 6 is a side view of a fourth example embodiment of a folding apparatus according to the invention.

FIG. 6 illustrates an example embodiment of a folding apparatus 10 in which teeth which can mesh with one another are constructed respectively on conveyor belts serving as rotating conveyor elements 16, 18. Between the teeth, in a manner similar to the folding apparatus illustrated in FIG. 1, individual folds are pre-shaped in the airbag 12 and subsequently result in the final folding of the airbag when the second portion 12b of the airbag 12 is laid alternately against the first and second abutment surfaces 22, 24 respectively.

Compression and packing methods may follow the folding, as illustrated in FIGS. 1 to 3.

Figure 7:
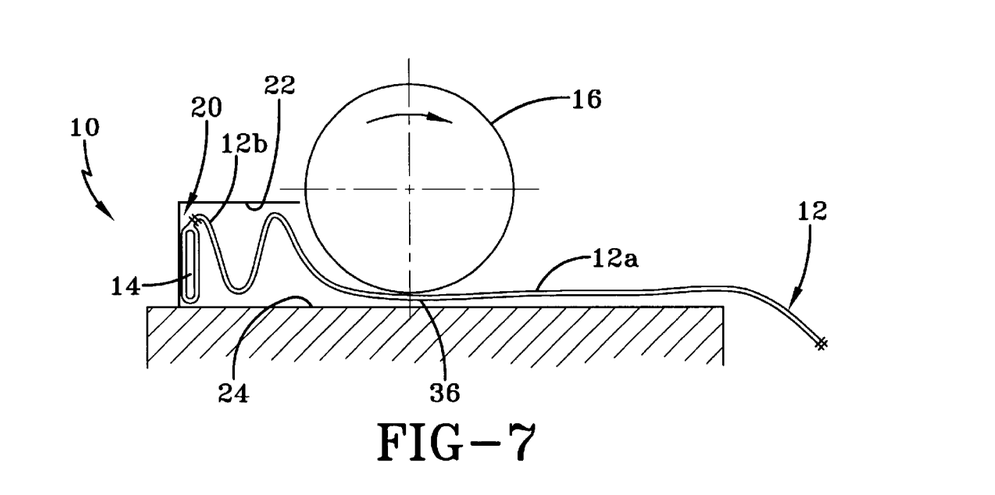
FIG. 7 is a side view of a fifth example embodiment of a folding apparatus according to the invention.

FIG. 7 illustrates a folding apparatus 10 of particularly simple construction. Here, an individual roller is arranged as a rotating conveyor element 16, opposite a horizontal sliding surface 36. On horizontal displacement, the airbag's own weight does not have an effect, so that from beginning to end of the conveying path a uniform holding force can be achieved at the conveyor element and hence uniform folding can be achieved. The spread-out airbag 12 is laid on the sliding surface 36, which extends horizontally. Directly next to the roller there is in a lying position a cup-shaped abutment 20 against the base whereof the airbag 12 is already laid with the filling hose 14 of a curtain airbag module located inside. The filling hose 14 may be held upright on the base by a holding apparatus, or it is erected from a horizontal position only when the airbag 12 is pushed in the direction of the base. By rotating the roller as the conveyor element 16, a first portion 12a of the airbag 12 is moved in the direction of the abutment 20, with a second portion 12b adjoining the first portion 12a in the direction of the filling hose 14 being folded inside the cup-shaped abutment 20. The second portion 12b arrives in abutment alternately against a first and a second horizontally arranged abutment surface 22, 24 respectively of the cup-shaped abutment 20. As a result of the first portion 12a of the airbag 12, pushed behind by the roller, the second portion 12b of the airbag 12 is folded regularly and in defined manner inside the cup-shaped abutment. The depth of the folding corresponds to the spacing between the two abutment surfaces 22, 24. The adhesive strength or frictional force of the roller 16 serving as a conveyor element may be adjusted as necessary by appropriate shaping of the surface of the roller or by setting the abutment force of the roller against the sliding surface 36.

FIGS. 8a to 8d illustrate a sixth example embodiment of a folding apparatus 10, in which a stepped support block 38 is provided as a base frame. The support block provides a lower support 40 and an upper support 42 which is higher up than the latter, and these each extend substantially horizontally and are separated from one another by a substantially vertical step 44. Arranged vertically in front of the step 44, in the region of the lower support 40, is a compartment wall 46 behind which a substantially slot-shaped compartment 48 is formed. In the region of the upper support 42 remote from the step 44 there is arranged a flap-type apparatus 50 which has a horizontally arranged receiver 52 for the filling hose 14 and the associated portion of the airbag 12, and a clamping apparatus 54 coupled thereto. The receiver 52 can be pivoted in the direction of the compartment 48 with the aid of two pivot arms 56, 58, with the pivot arms 56, 58 being applied such that they first almost form a parallelogram but on subsequent pivoting cross, and on pivoting the rotational position of the receiver is altered by 90° clockwise, as seen in FIGS. 8a to 8d.

Figure 8A:
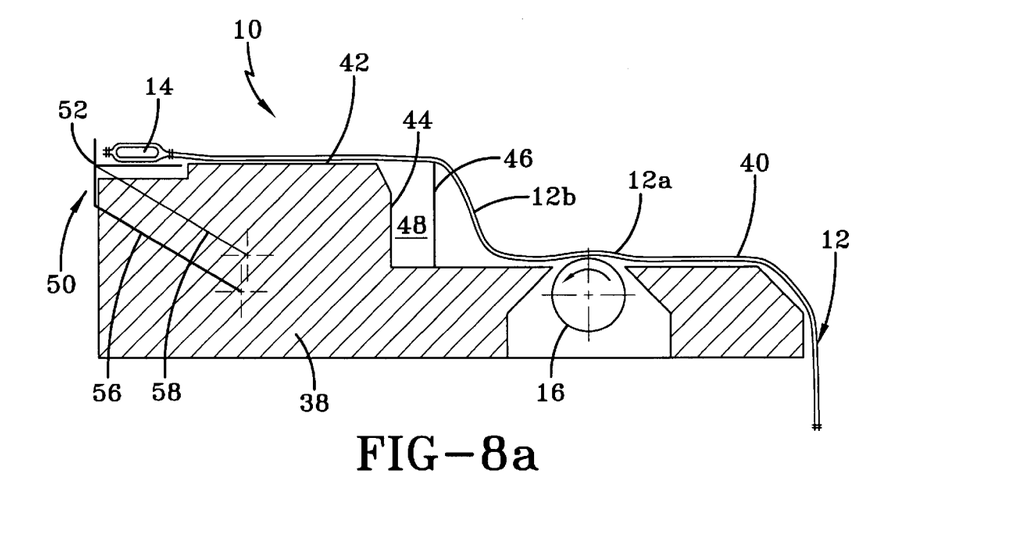
FIG. 8a is a side view of a sixth example embodiment of a folding apparatus according to the invention in a first operating position.

Approximately in the center of the lower support 40, a roller 16 acting as a conveyor element is arranged such that it can rotate into the stepped support block 38. The roller 16 projects out of the lower support surface 40.

An airbag 12 having the associated filling hose 14 is laid in the receiver 52 onto a folding apparatus 10 constructed in this way and is then spread out over the stepped support block 38, as illustrated in FIG. 8a. The airbag 12 then extends over the compartment wall 46 and over the roller 16 and hangs over the edge of the stepped support block 38 at the end of the lower support 40 opposite the step 44.

Figure 8B:
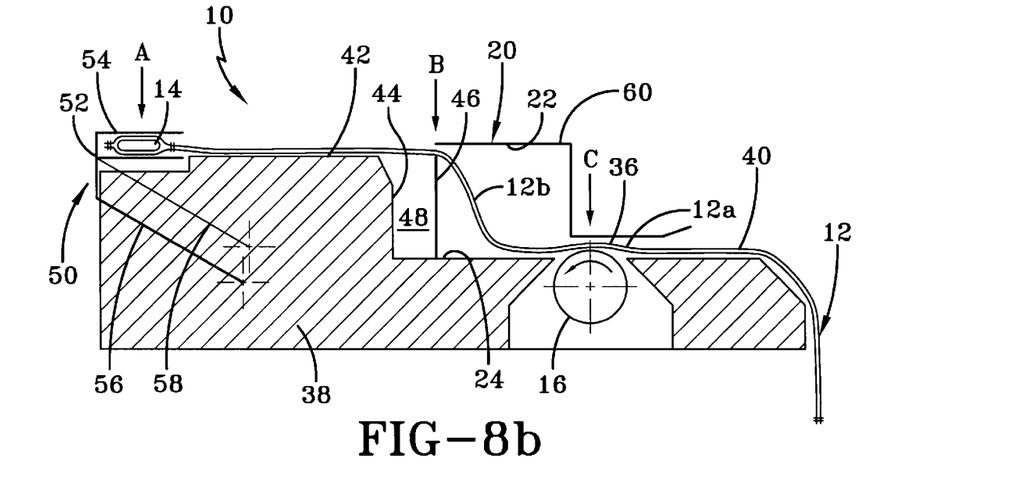
FIG. 8b is the side view according to FIG. 8a in a second operating position.
Figure 8C:
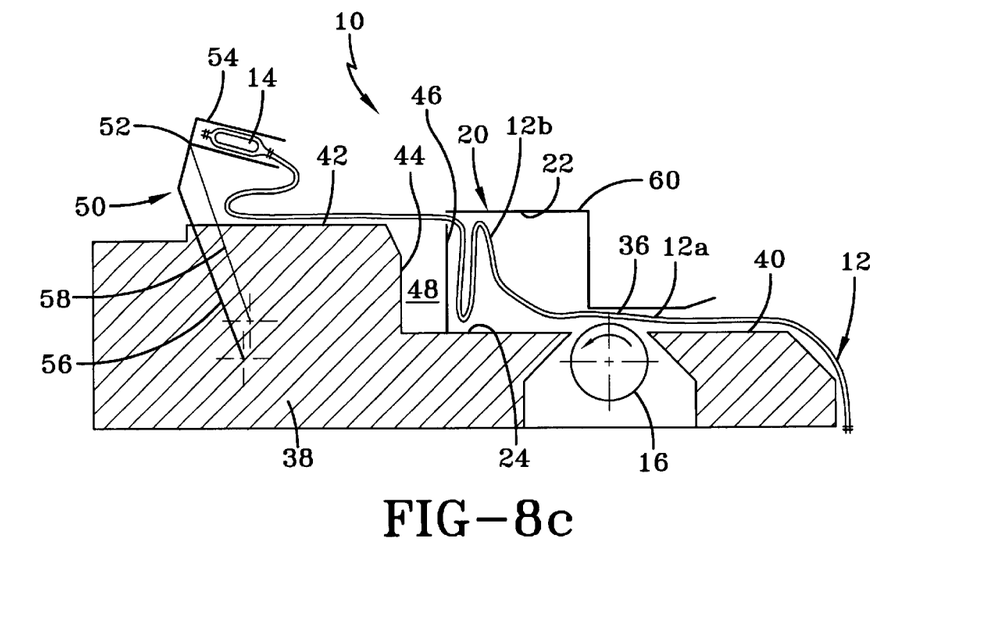
FIG. 8c is the side view according to FIG. 8a in a third operating position.
Figure 8D:
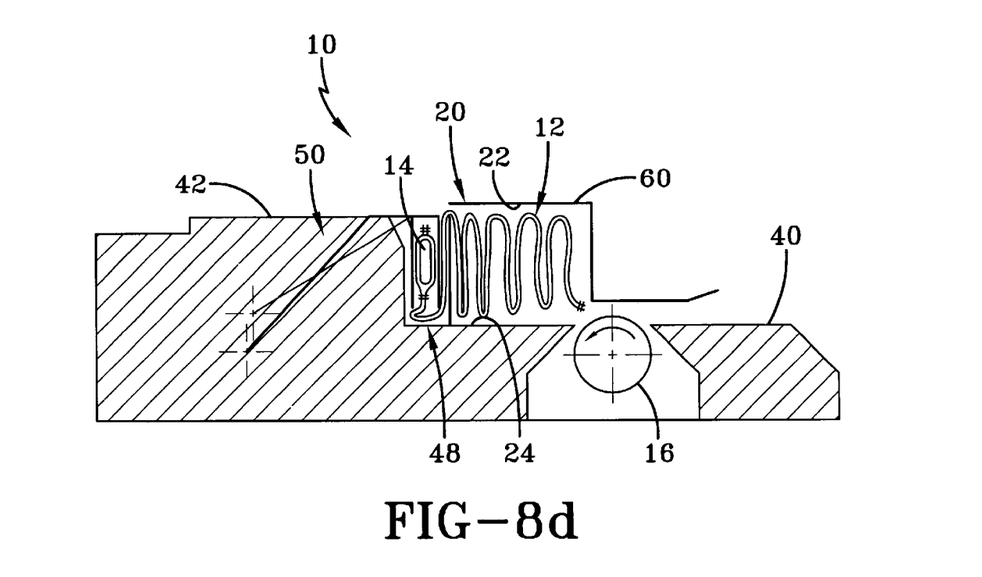
FIG. 8d is the side view according to FIG. 8a in a fourth operating position.

Over an airbag 12 arranged in this way there is then laid a stepped cover 60, as illustrated in FIG. 8b, which has a sliding surface 36 opposite the roller 16. Between the cover 60, the compartment wall 46 and the lower support 40 a cup-shaped abutment 20 is thus formed, into which the airbag 20 lying on the lower support 40 can be folded up with the aid of the roller 16, similarly to the example embodiment illustrated in FIG. 7. This folding procedure is illustrated in FIGS. 8c and 8d, in each case on the right-hand side of the figures. By setting the abutment force of the stepped cover 60 and the sliding surface 36 thereof against the roller 16, it is possible to influence the holding force between the airbag 12 and the roller 16. For this purpose, it is also possible in particular to alter the vertical position of the roller 16 (see clamping region C in FIG. 8b).

During folding, the airbag 12 is clamped between the upper edge of the compartment wall 46 and the cover 60 opposite (see small region B in FIG. 8b). This ensures that the portion of the airbag 12 located on the upper support 42 is not displaced during folding.

While folds are being laid in defined manner in the region of the stepped support block 38 illustrated at b in FIG. 8b with the aid of the roller 16, at the same time the airbag 12, together with the filling hose 14, can be pivoted by the flap-type apparatus 50 from the upper support 42 into the compartment 48. In this procedure, as illustrated in FIGS. 8c and 8d, the filling hose 14 is pushed away out of its horizontal position over the upper support 42 and vertically into the compartment 48, and at the same time rotated by an angle of 90° clockwise. For movement, the filling hose 14 is clamped against the receiver 52 by the clamping apparatus 54 (see clamping region A in FIG. 8b). The clamped filling hose 14 is displaced over the upper support 42 on being pivoted by the flap-type apparatus 50, with two layers of the airbag 12 being arranged on the left-hand side (as seen in FIG. 8c) of the filling hose 14, and on subsequent pushing into the compartment 48 a further layer coming to lie on the right-hand side (as seen in FIG. 8d) of the filling hose 14.

In order to make introduction of the airbag 12 into the compartment 48 easier, an introduction ramp is provided on the step 44 and possibly also on the compartment wall 46 respectively.

Figure 9A:
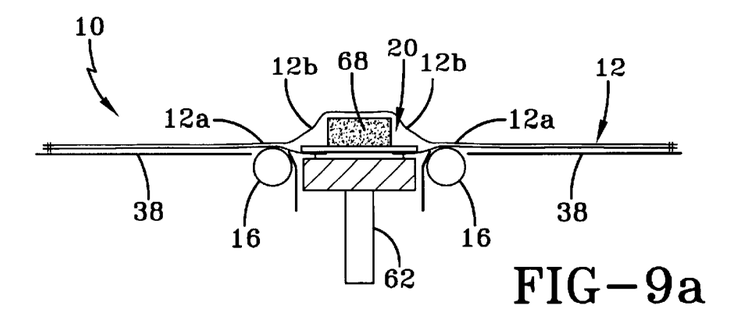
FIG. 9a is a cut-away side view of a seventh example embodiment of a folding apparatus according to the invention in a first operating position.
Figure 9B:
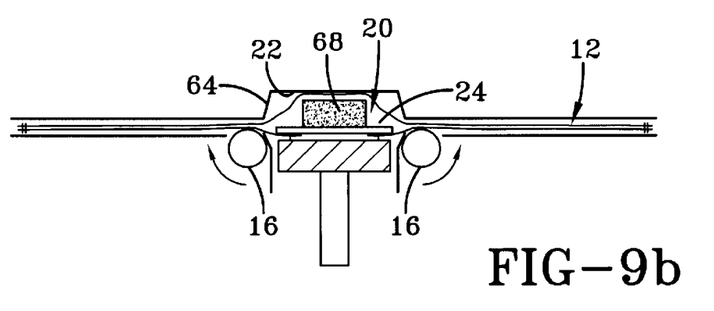
FIG. 9b is the side view according to FIG. 9a in a second operating position.
Figure 9C:
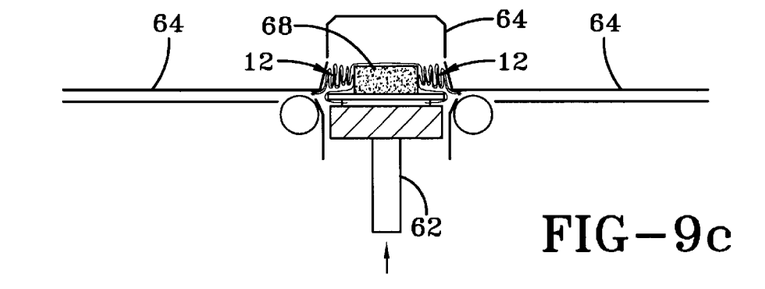
FIG. 9c is the side view according to FIG. 9a in a third operating position.

FIGS. 9a to 9c illustrate a seventh example embodiment of a folding apparatus 10 provided for a driver side or passenger side airbag module. With a module of this kind, a gas generator receiver 68 for a gas generator is located in the center of an airbag which in the spread-out condition is substantially circular or elliptical. A gas generator may be placed in the gas generator receiver 68. Alternatively, the gas generator may be introduced only after a folding procedure. Instead of the gas generator receiver 68, it is also possible for a gas generator to be arranged in this region of the airbag by itself.

Figure 11A:
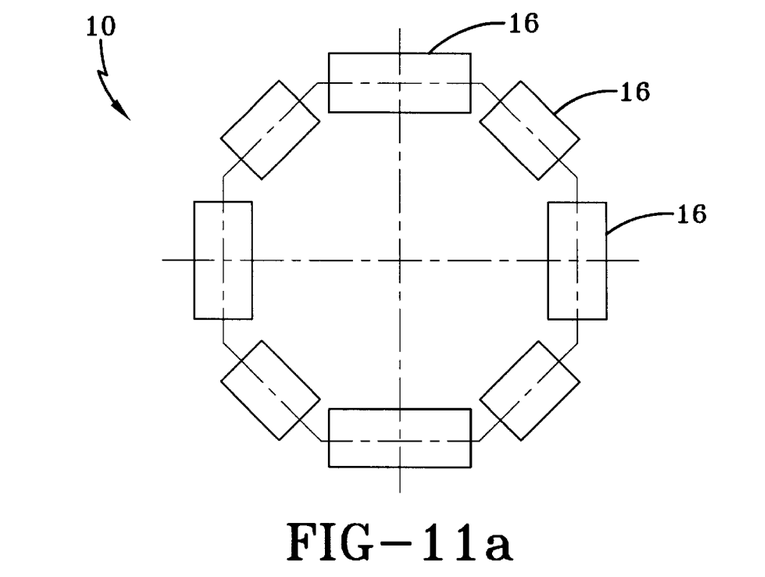
FIG. 11a is the plan view of a folding apparatus according to one of FIGS. 9a to 9c or FIG. 10 in a first variant.
Figure 11B:
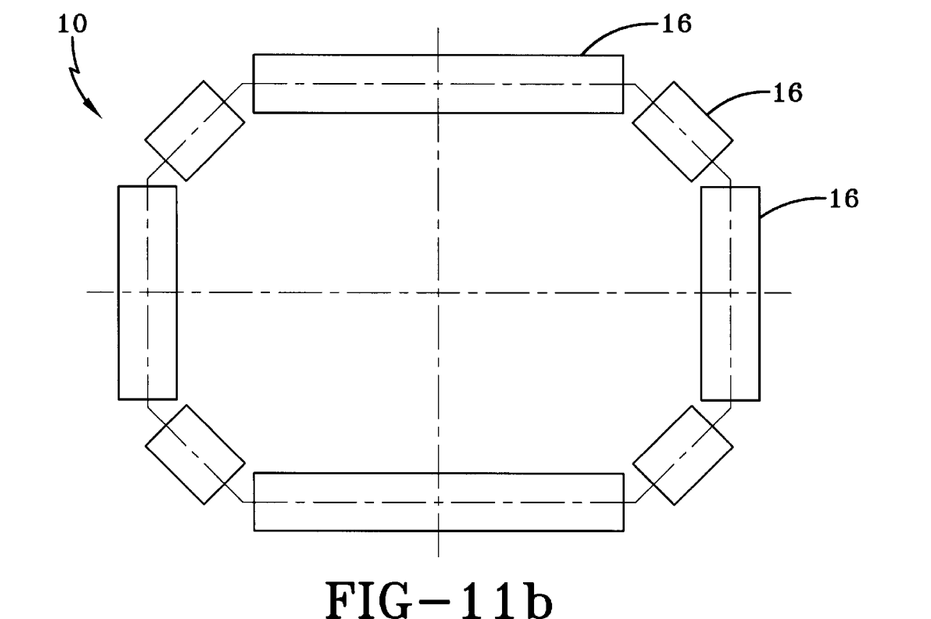
FIG. 11b is the plan view according to FIG. 11a in a second variant.

The folding apparatus 10 is formed with the aid of a support block 38 which extends substantially horizontally and in which a plurality of rollers 16 are used as rotating conveyor elements. As illustrated in FIG. 11a or FIG. 11b, the rollers respectively have different lengths and are arranged in the support block 38 in a substantially circular or elliptical shape. In the center of the rollers 16, the gas generator receiver 68 of a module is arranged in the region of a vertically movable slide means 62. The airbag 12 is spread out around the gas generator receiver 68 on the support block 38. A hat-shaped cover 64 is slipped over the spread-out airbag 12. By rotating the rollers 16 in each case with respect to the center of the hat-shaped cover 64, the spread-out airbag 12 is conveyed in the direction of the gas generator receiver 68 in a manner similar to the example embodiment illustrated in FIG. 7, and in so doing defined folding of the airbag 12 inside the hat-shaped cover 64 is obtained. An external vertical wall of the gas generator receiver 68 forms an abutment 20 during folding, against which the airbag 12 is pushed. During this the rollers 16 rotate in opposing directions in the direction of the center of the hat-shaped cover 64.

As illustrated in FIG. 9c, a central cover flap may be opened in the hat-shaped cover 64 and the cup-shaped housing 66 of a driver side or passenger side airbag module to be mounted may be arranged above this cover flap. The vertically directed sides of the hat-shaped cover 64 form a conical tapering which is directed towards the housing 66 and into which the folded airbag 12 and the gas generator receiver 68 may be displaced and on into the cup-shaped housing 66 with the aid of the slide means 62.

Figure 10:
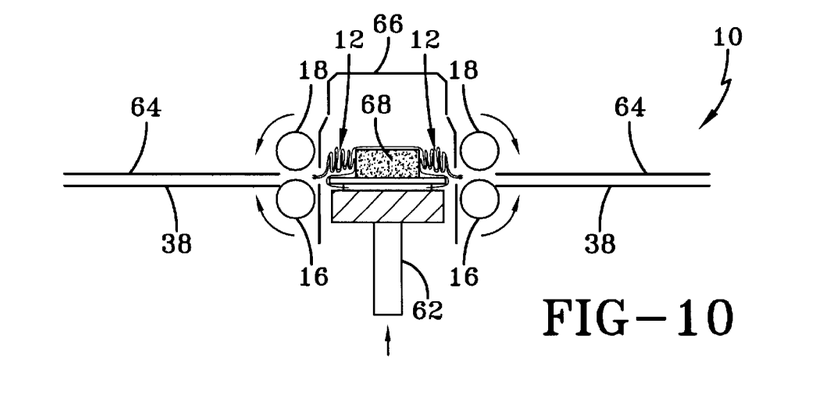
FIG. 10 is a cut-away side view of an eighth example embodiment of a folding apparatus according to the invention.

FIG. 10 illustrates an eighth example embodiment of a folding apparatus 10 in which counter-rollers 18 are provided on a hat-shaped cover 64 in each case opposite the rollers 16, as rotating conveyor elements. The rest of the arrangement corresponds substantially to that according to FIGS. 9a to 9c.

The folds of the airbag which are constructed in accordance with the invention may advantageously be pushed together in a subsequent step and further compressed in that the individual layers of the folded airbag are pressed against one another using in particular at least one compression roller or compression slide means.

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method of folding an airbag for a vehicle occupant restraining system comprising the steps of: a first portion of the spread-out airbag is moved to push a second portion of the airbag against an abutment which has at least one abutment surface extending substantially parallel to the direction of movement, so that the second portion of the airbag is laid in folds; and moving the first portion of the airbag in the direction of the abutment by means of at least one rotating conveyor element.

2. The method of folding an airbag for a vehicle occupant restraining system according to claim 1, wherein the first portion of the airbag is supported with respect to the rotating conveyor element.

3. The method of folding an airbag for a vehicle occupant restraining system according to claim 2, wherein the first portion of the airbag is supported with the aid of a sliding surface, with the first portion of the airbag capable in particular of being displaced horizontally.

4. The method of folding an airbag for a vehicle occupant restraining system according to claim 2, wherein the first portion of the airbag is supported with the aid of the conveyor element which itself rotates.

5. The method of folding an airbag for a vehicle occupant restraining system according to claims 1 further comprising the step of moving the first portion of the airbag with the aid of at least one conveyor element constructed as a cylindrical roller.

6. An apparatus for folding an airbag of a vehicle occupant restraining system, the apparatus comprising
   a conveyor means for moving a first portion of the spread-out airbag in order thus to push a second portion of the airbag against an abutment, and
   the abutment has at least one abutment surface extending substantially parallel to the direction of movement of the first portion of the airbag, so that the second portion of the airbag is laid in folds, the conveyor means is formed by at least one rotating conveyor element which moves the first portion of the airbag in the direction of the abutment.

7. The apparatus for folding an airbag of a vehicle occupant restraining system according to claim 6, wherein the at least one rotating conveyor element is a roller.

8. The apparatus for folding an airbag of a vehicle occupant restraining system according to claim 6, wherein the rotating conveyor element acts on the first portion of the airbag in opposition to a support.

9. The apparatus for folding an airbag of a vehicle occupant restraining system according to claim 8, wherein the support is formed as a sliding surface which is in particular arranged substantially horizontally.

10. The apparatus for folding an airbag of a vehicle occupant restraining system according to claim 8, wherein the support is a rotating conveyor element.

* * * * *